United States Patent [19]
Peterson

[11] Patent Number: 5,504,901
[45] Date of Patent: Apr. 2, 1996

[54] POSITION INDEPENDENT CODE LOCATION SYSTEM

[75] Inventor: R. Kim Peterson, Seattle, Wash.

[73] Assignee: Digital Equipment Corporation, Maynard, Mass.

[21] Appl. No.: 12,622

[22] Filed: Feb. 2, 1993

Related U.S. Application Data

[63] Continuation of Ser. No. 404,835, Sep. 8, 1989, abandoned.
[51] Int. Cl.⁶ .............................. G06F 9/30; G06F 15/00
[52] U.S. Cl. ................. 395/700; 364/262.5; 364/280.4; 364/282.2; 364/DIG. 1
[58] Field of Search ...................................... 395/650, 700

[56] References Cited

U.S. PATENT DOCUMENTS

| | | | |
|---|---|---|---|
| 4,525,780 | 6/1985 | Bratt et al. ............................... | 395/800 |
| 4,742,447 | 5/1988 | Duvall et al. ............................ | 364/200 |
| 4,803,619 | 2/1989 | Bernstein et al. ....................... | 395/800 |
| 4,967,391 | 10/1990 | Iijima ....................................... | 364/900 |
| 4,980,842 | 12/1990 | Kamanda et al. ....................... | 364/200 |
| 4,989,137 | 1/1991 | Oxley et al. ............................. | 364/200 |
| 4,992,979 | 2/1991 | Aichelman, Jr. et al. ............... | 364/900 |
| 5,193,191 | 3/1993 | McKeeman et al. .................... | 395/700 |

OTHER PUBLICATIONS

Winch, A Modular Approach to 16000 Software, 21 Feb. 84, pp. 29–31 and 33.

*Primary Examiner*—Kevin A. Kriess
*Assistant Examiner*—John Q. Chavis
*Attorney, Agent, or Firm*—Christensen, O'Connor, Johnson & Kindness

[57] ABSTRACT

Disclosed is a position independent code system that enables a programmable digital data processing system to invoke and execute procedures and access data that are loaded into system memory at addresses that are not specified by the program code and are not determined until the program code is compiled, linked and loaded into system memory. The coded call sequence instructions that are provided by the disclosed position independent code allow a procedure to call another procedure and are based upon the value that is stored in a dedicated register (or equivalent memory space) of the system and memory offset pointers, which are determined during system compilation and linking of program code and which indicate the memory location of the calling procedure and the call sequence of the calling procedure relative to the memory location at which the system stores the address of the procedure being called. When a call sequence is executed, the address of the called procedure is transferred to the dedicated register. Similar position independent code instructions are utilized for accessing a data set that is stored in memory external to the procedure, without transferring the address of the accessed data to the dedicated register. Compatibility between procedures that employ the disclosed position independent code and programmed code that is written for use with prior art position dependent code can be established by supplementing and modifying the position dependent code procedures during compilation and linking.

22 Claims, 7 Drawing Sheets

POSITION INDEPENDENT CODE LOCATION SYSTEM

This application is a continuation application based on prior application Ser. No. 07/404,835, filed on Sep. 8, 1989 now abandoned.

FIELD OF THE INVENTION

This invention relates generally to the field of digital data processing systems. More specifically, this invention relates to position independent code arrangements that enable a digital data processing system to locate and thereby utilize procedures and data that are loaded into unspecified regions of system memory (i.e., are loaded at memory addresses that are not specified or dictated by the computer code).

BACKGROUND OF THE INVENTION

In modern digital data processing systems, a desired data processing task typically is accomplished by the selective execution of a plurality of procedures. In such an arrangement, each procedure is a sequence of executable instructions that performs a specific processing subtask and the collection of procedures that is employed collectively defines the instruction set required for the system to accomplish the particular desired data processing task. As is known in the art, in any given process, the procedures are not necessarily executed sequentially. For example, to accomplish a particular subtask, a procedure may invoke ("call") one or more additional procedures which perform a portion of the subtask and, upon execution of the called procedure, either return control and execution to the calling procedure or transfer control and execution to yet another procedure. As also is known in the art, one or more of the procedures utilized in carrying out a particular data processing task can be invoked and executed a number of times before the desired result is obtained.

Using a collection of procedures to define a processing task has well known advantages from the standpoint of memory overhead (i.e., minimizing the amount of system memory required for execution of the process). In addition, using a collection of procedures has well-known advantages from the standpoint of reducing the complexity of programming the digital data processing system. For example, with regard to procedures that are executed a number of times, (i.e., repeated at various execution points of a process), only a single instruction set for the procedure need be stored in system memory and invoked as needed. This not only reduces the amount of memory required for storing coded instructions, but also decreases system complexity from the programming standpoint. Specifically, virtually all high level programming languages allow the system programmer to write a program that includes procedure declarations and procedure calls that respectively create procedures and allow a created procedure to be invoked and executed at desired points of the computer program. This not only eliminates copying of the procedure instructions at various points of the program, but allows the programmer to create programs that can be used again in other processes. That is, the programmer can create "program parts" for various tasks that are not uniquely related to the digital data processing task at hand.

Use of program parts and separate procedures to define processes for execution by digital data processing systems has resulted in the availability of numerous programs and procedures which are of general application and, therefore, can be incorporated as procedures in various data processing situations. In this regard, it has become widespread practice to utilize available programs and procedures as program parts that are loaded into the data processing system through conventional input/output devices and to prepare and load any additional program parts that are required in order to define a desired process. Further, many digital data processing systems include one or more libraries that include various procedures of general application, with the libraries being resident in system memory. The procedures of such libraries can be invoked and executed on an as needed basis in response to procedure calls that are included in program parts that are loaded into the system by the system user.

In order for a digital data processing system to transfer control and execution to another procedure or access data that is required during execution of a procedure, the system must be able to locate the storage location of the procedure being invoked or the storage location of the data being accessed. The simplest and earliest technique for locating another procedure or data consists of including in the instructions of a procedure the specific memory address of the procedure or data. Alternatively the procedure can include instructions for calculating the required address based on some other specific memory address. Successful execution of this type of code will not occur unless the digital data processing system loads the procedures to be invoked and the data to be accessed at particular, predetermined memory addresses that are dictated by the code. Because of the dependency upon loading of data and processes at specific memory addresses, this type of code sometimes is called position dependent code.

The use of position dependent code can present a substantial drawback, especially in situations in which a large number of procedures are employed or access to a large number of data sets is required. Specifically, memory space must be dedicated at code dictated addresses for storage of the procedures that might be invoked during a process and memory space also must be dedicated for storage of all data sets that might be accessed during execution of the process. In many situations, the procedures employed during a process (and the data accessed) will depend upon conditions that are determined and events that occur during execution of the process. Using position dependent code in such a situation means that procedure and data will occupy memory space even though the procedures are never invoked and the data is never accessed during execution of the process. More important, situations exist in which the memory address of data that is to be executed or procedures that are to be invoked are not known at the time at which the procedures that will access the data or invoke the other procedures are loaded into system memory. Of primary consideration in this regard is the dynamic loading of procedures such as shared library procedures that are not brought into the process until the library procedure is referenced (called during execution of previously loaded procedures). Since the memory address at which a dynamically loaded procedure will be stored cannot be determined until the procedure is brought into the process, position dependent code cannot successfully invoke such procedure.

To overcome the above-discussed drawbacks and disadvantages, various position independent code techniques have been developed that allow the system to access data and invoke procedures that are loaded into portions of memory that are not preassigned or identified until the data to be accessed and/or the procedures to be invoked are loaded for execution. This not only allows dynamic loading of shared library procedures and data, but also can result in a substantial reduction in memory overhead. Moreover, because position independent code includes no references to specific memory addresses, the code can be used to establish procedures in processes other than the process for which the code is written. Further, using procedures that employ position independent code can be a distinct advantage in situations such as data processing systems that perform concurrent (parallel) processing. For example, in a parallel processing environment any particular procedure may be concurrently invoked and executed by more than one processing unit and some of the procedures may be invoked and executed several times. If position dependent code is utilized in such procedures, it may be difficult (or even impossible) to store data accessed by the procedure and/or procedures that are called by the procedure at code dictated memory locations for each concurrent use of the procedure.

Both hardware devices and software systems have been developed to facilitate the use of position independent code in digital data processing systems. Although satisfactory in many situations, prior art hardware devices increase both the cost and complexity of the data processing system. Prior art systems that utilize only software also are satisfactory in many situations, but these systems also have distinct disadvantages and drawbacks. For example, one prior art system is limited to digital data processing systems that maintain a program counter in a general register of the central processing unit. In that type of arrangement, the position independent code that is used to access data that is external to the procedure or to call a different procedure includes instructions for adding a specific offset value to the current value of the program counter to thereby generate an address at which the data to be accessed or procedure to be invoked must be stored. In some instances, the address generated by adding the offset value to the current value of the program counter is not the memory address of the data or procedure, but is an address in memory at which the address of the procedure or data can be found.

The primary drawback of prior art position independent code that utilizes and relies upon a general register program counter is inefficiency, both with respect to minimizing the amount of memory space required for execution of a process and with respect to attaining minimum execution time for a process. Accordingly, a need exists for improved methods of providing position independent code.

SUMMARY OF THE INVENTION

This invention provides a new and improved position independent code arrangement that can be used to invoke procedures and access data that are loaded into system memory at locations that are not specified by the code and need not be specified until the data or procedures to be invoked are brought into the process. Thus, in processes in which an image of one or more procedures and associated data are initially loaded into system memory and execution of one of the procedures invokes a procedure that is external to the current image file, an image of the called procedure can be dynamically loaded into system memory at any available address and the address provided to the calling procedure at the time of the dynamic loading. The invention, however, is not limited to processes that dynamically load data and called procedures. For example, the invention does not rely upon a program counter or any other special feature of a digital data processing system. Thus, the invention can be practiced in a wide range of processing environments. Further, since few instructions are required to formulate call sequences that invoke a selected procedure or access a selected data set, the invention is efficient both with respect to system memory overhead and speed of execution.

In addition to providing position independent code that is highly efficient from the standpoint of memory overhead and system execution time, the invention can be configured so as to in effect convert position dependent code to position independent code. This feature of the invention allows programs that are written for use with position dependent code to be used as program parts in a process that utilizes position independent code. Thus, in these arrangements of the invention, the system user need not modify nor rewrite existing programs that were written in accordance with position dependent code specifications.

In accordance with the invention, a specific memory location of the digital data processing is designated for storage of the entry point address of the particular procedure being executed by the system. In the currently preferred embodiments of the invention, the designated storage location is a register of the central processing unit that executes the procedure, with such register being referred to herein as the procedure entry point register.

The position independent code instructions for calling another procedure or accessing data that is stored external to the procedure are generated during compilation and linking operations and are formulated in a manner that causes the system to determine the location of a called procedure (or the location of data to be accessed) when the instructions are executed (i.e., during run-time execution). When the system executes instructions that call another procedure, the address of the called procedure is transferred (passed) to the procedure entry point register.

In the practice of the invention, the instructions for calling another procedure or accessing data that is external to a procedure resolve the memory location of the called procedure (or data to be accessed) based upon the value that is currently stored in the entry point address register and two memory offset pointers that are established during the compilation and linking of the procedures. The first memory offset pointer is an "instruction offset," which indicates the memory location of the instructions for calling the other procedure (or for accessing data) relative to the entry point address of the procedure that includes the procedure call (or data access) instructions. The second memory offset pointer is an "address offset," which indicates the memory location of the instructions for calling another procedure (or for accessing data) relative to a memory location at which the address of the called procedure (or data to be accessed) was loaded by the system (during system linking and loading operation). In essence, the position independent code of the invention provides instructions which:

(a) allow the digital data system to use the current procedure point entry address and the instruction offset for determining the memory address of the instructions for calling another procedure (or for accessing external data); and, (b) allow the system to locate the address of the called procedure (or external data), based upon the memory address of the instructions and the address offset.

If the instructions are for calling another procedure, the address of the called procedure is passed to the entry point address register so that additional procedures can be called or additional data sets can be accessed using the position independent code of the invention.

Data external to a procedure being executed can be accessed in the same manner. However, since control is not transferred from the procedure accessing external data, it is not necessary to pass the address of the accessed data, i.e., transfer the address of the accessed data to the entry point address register. Accordingly, in the currently preferred embodiments of the invention, the coded instructions for accessing data external to the procedure differs somewhat from the coded instructions that are used to call and invoke another procedure.

BRIEF DESCRIPTION OF THE DRAWING

The above-mentioned advantages and features of the invention, and others, will become apparent skilled in the art with reference to the following description taken in conjunction with the accompanying drawing, in which.

DETAILED DESCRIPTION

Figure 1:
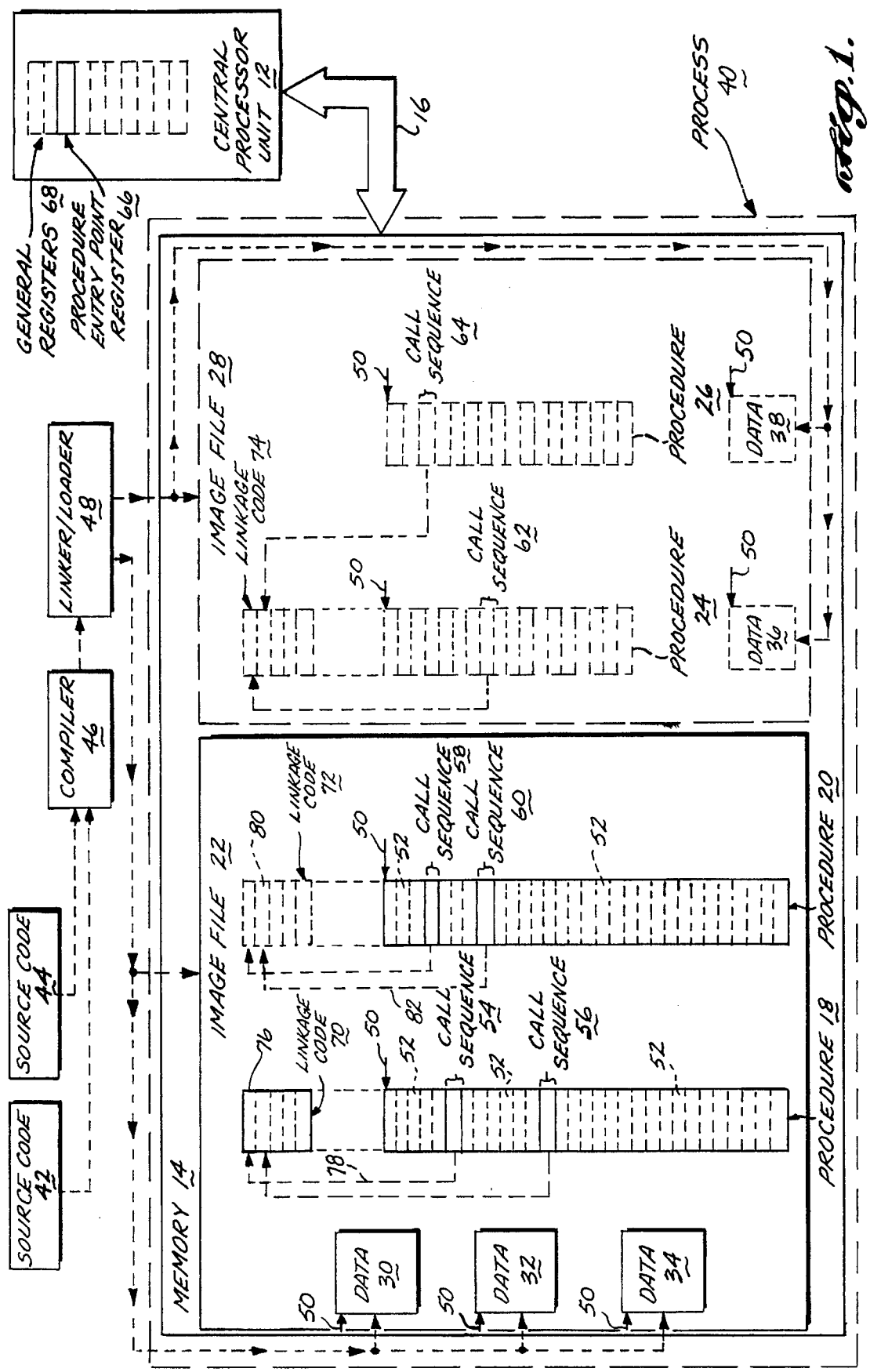
FIG. 1 depicts, in block diagram form, a digital data processing system that is configured and arranged for the practice of the invention.

FIG. 1 diagrammatically depicts a portion of a typical digital data processing system and further, illustrates the manner in which such digital data processing system is controlled and arranged to provide a system of position independent code location that is in accordance with this invention. Included in the depicted portion of the digital data processing system is a central processor 12 and a memory 14. As is known in the art, central processor 12 includes the circuitry required to interpret and execute coded instructions that are loaded into memory 14 to thereby perform desired data processing tasks. In the exemplary arrangement of memory 14 that is shown in FIG. 1, the data processing task to be performed by the system is defined by procedures 18 and 20, which are illustrated as being within an image file 22 of memory 14 and procedures 24 and 26, which are depicted as being within an image file 28 of memory 14.

To perform the processing task defined by procedures 18, 20, 24 and 26, central processor unit 12 communicates with memory 14 via an addressing and data bus 16 to sequentially access or fetch coded instructions of the procedure being executed and perform the function specified by the instructions. During the course of this process, instructions of a procedure being executed can cause central processor unit 12 to access a stored set of data items (data sets 30, 32, 34, 36 and 38 in FIG. 1) and process the access data in a desired manner. Further, at any point in the execution of a procedure, a coded instruction of one procedure can cause central processor unit 12 to invoke and begin executing an instruction set that is included in one of the other procedures. Typically coded instructions that result in invocation and execution of a different procedure are referred to as "call sequences," (or "calls") with the procedure that includes a call sequence being referred to as the calling procedure and the procedure invoked by the call being referred to as the called procedure.

As also is known to those skilled in the art, a portion of the procedures and data that make up a process (e.g., process 40 in FIG. 1) can be supplied from one or more libraries that are maintained in system memory, with the remaining procedures and data being supplied by the system user. For example, for purposes of describing the invention, it is assumed that procedures 18 and 20 of image file 22 and data sets 30, 32 and 34 result from the compilation, linking and loading of user supplied programs (e.g., applications programs). In FIG. 1, the-user supplied programs are shown as source code modules 42 and 44; the program that translates the programming language used in formulating source code modules 42 and 44 is identified as compiler 46; arid the service routine that converts the output of compiler 46 (object files) into procedure and data files and loads procedures 18 and 20 into memory 14 is identified as linker/loader 48. For purposes of describing the invention, it also is assumed that procedures 24 and 26 of image file 28 and data sets 36 and 38 are obtained from a system library that includes procedures and data sets that can be processed to accomplish processing tasks of relatively widespread application. That is, procedures 24 and 26 and data sets 36 and 38 define computational subroutines or other data processing routines that can be used in partially defining a variety of different processes. In addition, for purposes of describing the invention, it is assumed that procedures 24 and 26 (image file 28) and data sets 36 and 38 are loaded into memory 14 of process 40 subsequent to the loading and partial execution of procedures 18 and 20 (image file 22). That is, it is assumed that image file 28 is dynamically activated in process 40 when one of the processes 24 or 26 is referenced (i.e. called) during execution of one of the procedures 18 and 20.

Regardless of the time at which the procedures and data sets are loaded into memory, linker/loader 48 causes each procedure 18, 20, 24 and 26 and each data set 30, 32, 34, 36 and 38 to be loaded into portions of memory that can be identified by an initial or starting memory address (indicated by arrows 50 in FIG. 1). For purposes of describing the invention, it is assumed that the starting address 50 of each procedure 18, 20, 24 and 26 identifies the initial instruction of the procedure (i.e., the procedure entry point). Following the initial instruction in each procedure 18, 20, 24 and 26 is a series of additional coded instructions 52. As will be recognized by those skilled in the art, procedures generally include additional data structure (not indicated in FIG. 1) such as procedure descriptors and attributes that are used for various purposes during the execution of the process.

As was previously mentioned, procedures often include coded instructions for accessing data that is external to the procedure so that the accessed data can be processed in accordance with instructions of the procedure. Further, procedures often include instructions to call another procedure for invocation and execution. In this regard, procedure 18 of FIG. 1 includes two call sequences 54 and 56; procedure 20 includes two call sequences 58 and 60; and, procedures 24 and 26 each include a single call sequence (62 and 64, respectively).

There are two basic types of calling sequences. First, the coded instructions that cause the central processor unit (12 in FIG. 1) to access a set of data or invoke and begin executing a different procedure can include an express specification of the address at which the data or procedure must be located in order for the procedure to be successfully executed. This express address specification may be the address itself, or, in some situations, the address specification may be in the form of executable instructions that use a specific address to calculate the address at which the data or procedure must be located. Instructions (code) of this type are referred to as position dependent code and procedures that include call sequences using position dependent code are referred to as position dependent procedures.

In the second basic type of call sequence, the coded instructions do not include the address of the procedure to be called or the address of the data set to be accessed. Nor does the code include any other specific memory address. Rather, the instructions include arguments such as offset pointer values which enable the central processing unit to calculate the address of the data (or procedure) or, alternatively, enable the central address of a memory location at which the address of the data (or procedure) is stored. This type of coded instructions is referred to as position independent code since the instructions do not depend upon loading the procedure to be called or the data to be accessed at memory addresses that are specified by the instructions. Instead, the data and procedures can be loaded into available memory space (e.g., by linker/loader 48 of FIG. 1), with the addresses of the loaded data and procedures being stored in memory in a manner that allows the data sets and procedures to be accessed when the position independent code calling sequences are executed.

In accordance with the position independent code system of this invention, when the procedures of a process are loaded into system memory for execution, the entry point address of the first procedure of the process is stored at a predetermined location in the digital data processing system (preferably, a predetermined general register of the system central processing unit). When the procedure calls a different procedure for invocation and execution by the central processing unit, execution of the calling procedure call sequence instructions causes the entry point address of the called procedure to be transferred (passed) to the predetermined memory location (e.g., general register). Thus, in effect, the calling sequences of the invention pass the address of the called procedure to the called procedure. These position passing call sequences are a feature of the invention that allow continued and repeated calls between various procedures without reference to a program counter. Thus, the invention can be employed in systems that do not include a general register program counter. Moreover, the invention is advantageous even in systems that include such a program counter because the position passing call sequences of the invention include few coded instructions. This means that the invention exhibits both low memory overhead and relatively high speed execution.

The position passing call sequences provided by the invention are indicated in the arrangement of FIG. 1 and will be described in more detail relative to FIG. 2. With respect to the exemplary arrangement of FIG. 1, in which procedures 18 and 20 are initially loaded into memory 14 of process 40 by linker/loader 48 (as a portion of image file 22), it can be assumed that procedure 18 is the first procedure to be executed. If procedure ]8 is the first procedure to be executed, a procedure entry point register 66 of central processor unit 12 is loaded with the entry point address 50 of procedure 18 when linker/loader 48 loads image file 22 into memory 14. As is indicated in FIG. 1, procedure entry point register 66 can be a register within a set of general registers 68 that are included in central processor unit 12. As was previously mentioned, in the alternative, the entry point of procedure 48 can be stored at any convenient location within memory 14.

When image file 18 is loaded into memory 14, linker/loader 48 also loads into memory 14 the entry point address of each procedure of image 18 that will be called during execution of another procedure of image 18. In addition, linker/loader 48 loads into memory 14 the starting address of each set of data that is to be called by a procedure of image 18 and is loaded into memory 14 at an address that is not within the memory space that stores the procedure. In the currently preferred embodiments of the invention, the entry point addresses of called procedures and initial addresses of the accessed, external data sets are stored in memory fields that form part of the linkage data structure for each procedure, i.e., the code generated by linker/loader 48 that connects separately coded routines or procedures. In FIG. 1, linkage code relating to the interconnection between procedures 18 and 20 of image file 22 is identified as linkage code 70; linkage code relating to the connection between procedure 20 (of image file 22) and procedure 24 (of image file 28) is identified as linkage code 72; and, linkage code relating to the connection between procedures 24 and 26 (of image file 28) is identified as linkage code 74.

Since, as previously noted, it is assumed in the arrangement of FIG. 1 that image file 28 is not loaded into memory 14 until procedure 24 or 26 of that image file is referenced (called) during execution of a procedure 18 or 20 of image file 22, neither image file 28 nor linkage code 72 reside in memory when execution of procedure 18 is initiated. To indicate this temporal relationship in FIG. 1, linkage code 72, image file 28 and the associated data sets 36 and 38 are shown in dotted outline.

Regardless of whether the addresses of the procedures to be called and the data to be accessed are stored as linkage code or at other memory locations, each address of a called procedure and each address of an accessed data set is locatable by means of the instructions included in a call sequence. More specifically, each memory location that stores an entry point address of a called procedure or the initial address of an accessed data set can be located relative to the memory address of the instructions to call that procedure or access that data set by employing a memory offset pointer. For example, in FIG. 1, memory field 76 of linkage code 70 stores the address of the procedure to be called (or the data to be accessed) by call sequence 54. The memory offset pointer that locates memory field 76 of linkage code 70 relative to the address of call sequence 54 is indicated by dashed arrow 78. If call sequence 54 of procedure 18 is a call that will invoke execution of procedure 20, memory field 76 will hold the entry point address of procedure 20 when image file 22 is loaded into memory 14. Further, during the operation of the digital data processing system to link procedure 18 and procedure 20, the value of memory offset pointer 78 will be incorporated in the instructions of call sequence 54. When call sequence 54 is executed, the value of memory offset pointer 78 will be used to locate memory field 76 and obtain the entry point address of procedure 20. The entry point address of called procedure 20 then is written into the memory space allocated for the storage of the procedure being executed (e.g., written into procedure entry point register 66 of FIG. 1).

In the currently preferred embodiments of the invention, the memory address of the call sequence instruction that is utilized with the above described memory offset pointer value is determined on the basis of the value stored in procedure entry point register 66 and a second memory offset pointer. Call sequence instructions that utilize the value stored in procedure entry point register 66 and the two above-mentioned memory offset pointer values will be described relative to FIG. 2. The manner in which call sequence instructions (including the offset pointer values) are established during system compilation, linking and loading and operations (e.g., by compiler 46 and linker/loader 48 of FIG. 1, will be described relative to FIGS. 6 and 7.

If, during the execution of procedure 20, a call sequence is encountered that invokes yet another procedure, the value stored in procedure entry point register 66 and additional offset values are utilized in the manner described above to cause central processor unit 12 to invoke and begin executing the procedure being called by procedure 20. For example, if call sequence 60 of procedure 20 in FIG. 1 calls procedure 24 of image file 28, the instructions of call sequence 60 will utilize the value stored in the procedure entry point register 66 (i.e., the entry point address 50 of procedure 20) and offset pointer values to locate a memory field 80 of linkage code 72, which will hold the address of procedure 24. However, as previously mentioned, in the example being discussed, image file 28 (which includes procedure 24), is not loaded into memory 14 until referenced by a procedure of image file 22. Thus, if call sequence 60 of procedure 20 is the first reference to procedure 24, neither procedure 24 nor linkage code 72 will be present in memory 14 of process 40. If this is the case, linker/loader 48 is activated by the digital data processing system and loads image file 28 into memory 14. During this loading sequence, linker/loader 48 also loads data sets 36 and 38, which as previously mentioned are data sets that may be required by procedures 24 and 26 of image file 28. As a portion of the linking and loading sequence, linker/loader 48 creates linkage code 72 and stores the address of procedure 24 in memory field 80. In addition, linker/loader 48 also alters or "fixes up" instructions within call sequence 60 of procedure 20 so that the instructions include the memory offset value required for accessing memory field 80 (e.g., the memory offset between call sequence 60 and memory field 80; identified in FIG. 1 by reference numeral 82). When linker/loader 48 has loaded image file 28 into memory 14 in the described manner, call sequence 60 is executed in the manner described relative to call sequence 54 of procedure 18 so that the address of procedure 24 (stored in memory field 80 by linker/loader 48) is passed to procedure entry point register 66 to thereby cause central processing unit 12 to begin execution of procedure 24 and to thereby allow any required subsequent calls to additional procedures.

Figure 2:
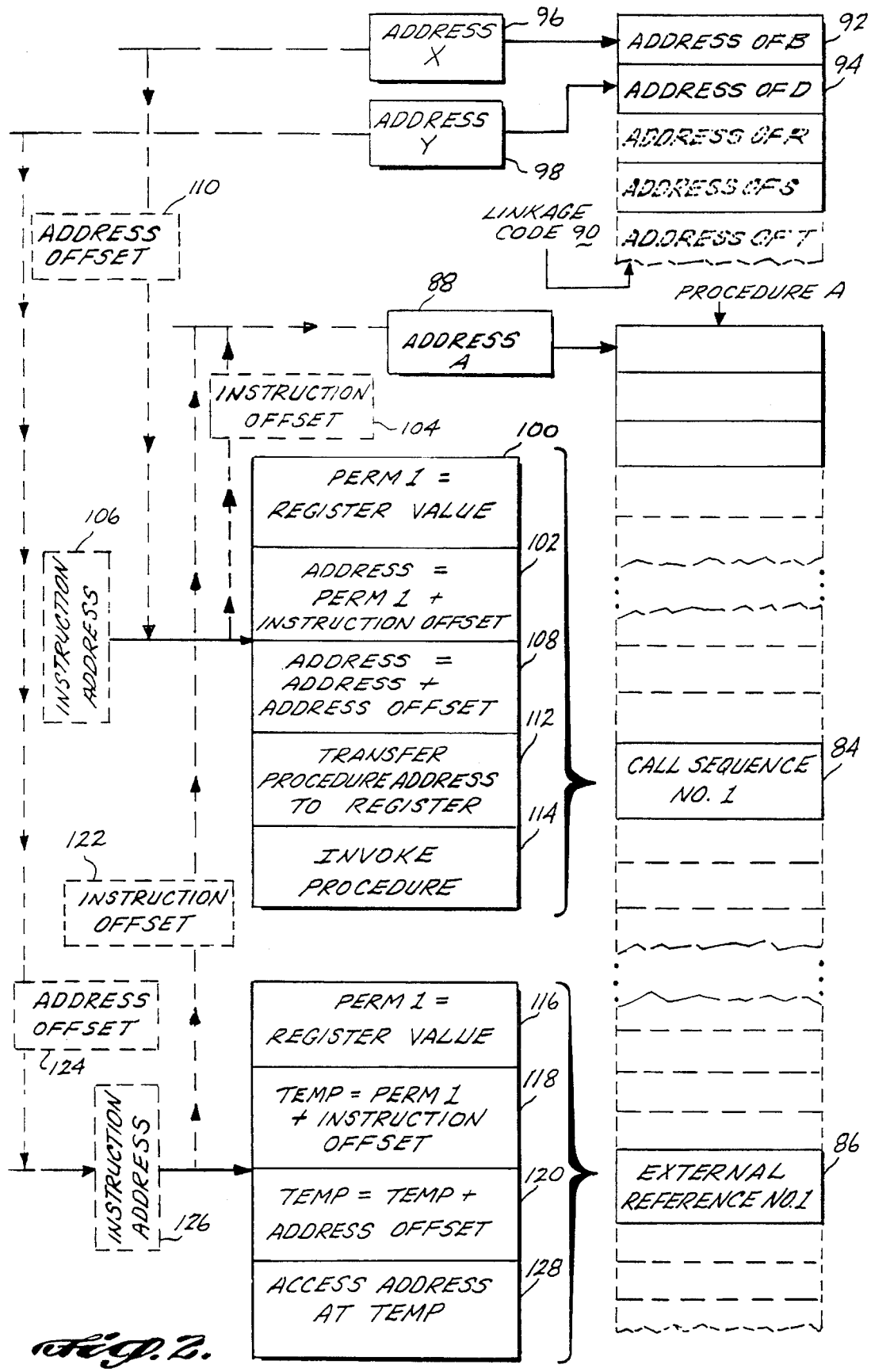
FIG. 2 illustrates memory storage of a procedure that is being executed by the digital data processing system and indicates the manner in which the position independent code of the invention is utilized for invocation and execution of a different procedure and, further indicates the manner in which the position independent code of the invention is utilized for accessing data that is stored externally to the procedure that requires access to the data.

Reference is now taken to FIG. 2, which illustrates in greater detail the manner in which call sequences are structured in accordance with the invention, both for calling a different procedure for invocation and execution and for accessing data that is external to the procedure that includes the call sequence. Following the description of the call sequences of FIG. 2 is a description of the manner in which the invention can be embodied so that position dependent procedures can be utilized in processes that otherwise consist of procedures that employ position independent code.

Shown in FIG. 2 is a procedure, identified as "Procedure A". Included in Procedure A is a call sequence 84, which will cause the system to invoke and execute a second procedure, "Procedure B". Also included in Procedure A is an external reference 86, for accessing data (Data Set D) that is external to the procedure. As is indicated by dashed outline 88, Procedure A previously was loaded into memory (e.g., memory 14 of FIG. 1) with an entry point address that is identified in FIG. 2 as Address A.

Also shown in FIG. 2 is linkage code 90" for Procedure A, which was formulated and loaded into memory during compilation, linking and loading of Procedure A. Included in linkage code 90 is a memory field 92 that stores the address of Procedure B and a memory field 94 that stores the address of Data Set D. As is indicated by dashed outlines 96 and 98, memory field 92 (and hence the address of Procedure B) is located in memory at Address X, and memory field 94 (and hence the address of Data Set D) is located in memory at Address Y.

As was discussed relative to FIG. 1, in accordance with the invention, the entry point address of the first procedure to be executed is stored in entry point address register 66 when process 40 is loaded into system memory and, further, the invention operates to transfer the address of a called procedure to the entry point address register 66 each time a different procedure is called. Thus, when Procedure A of FIG. 2 is being executed by the digital data processing system, entry point address register 66 stores Address A. As also was mentioned relative to FIG. 1, the memory field that stores the address of the procedure being called (memory field 92, in FIG. 2) is locatable by means of a memory offset pointer value that indicates the memory location of the memory field relative to an instruction of the call sequence. This relationship can be represented mathematically as:

ADDRESS=CALL INSTRUCTION ADDRESS+ADDRESS OFFSET where, ADDRESS denotes the address of the memory location that stores the address of the called procedure, CALL INSTRUCTION ADDRESS represents the memory address of a specific instruction in the call sequence, and ADDRESS OFFSET represents the memory offset pointer value that indicates the memory location at which the address of the procedure being called is stored (e.g., memory offset pointers 78 and 82 of FIG. 1). However, the CALL INSTRUCTION ADDRESS cannot be explicitly set forth in the instructions of the call sequence, since no express memory addresses can be included in position independent code. Thus, call sequences in accordance with the invention include instructions that in effect result in the calculation of the CALL INSTRUCTION ADDRESS. In the currently preferred embodiments, the method by which the CALL INSTRUCTION ADDRESS is determined can be mathematically represented as

CALL INSTRUCTION ADDRESS=ENTRY POINT ADDRESS REGISTER VALUE +INSTRUCTION OFFSET where ENTRY POINT ADDRESS REGISTER VALUE denotes the value stored in entry point register 66 when the call instruction sequence is executed (i.e., the entry point of the procedure being executed) and INSTRUCTION OFFSET represents the value of a memory offset pointer that indicates the memory location of the CALL INSTRUCTION ADDRESS relative to the entry point of the procedure that includes the call sequence being executed.

Combining the two above set forth mathematical relationships yields

ADDRESS=ENTRY POINT REGISTER VALUE+INSTRUCTION OFFSET +ADDRESS OFFSET

Figure 6:
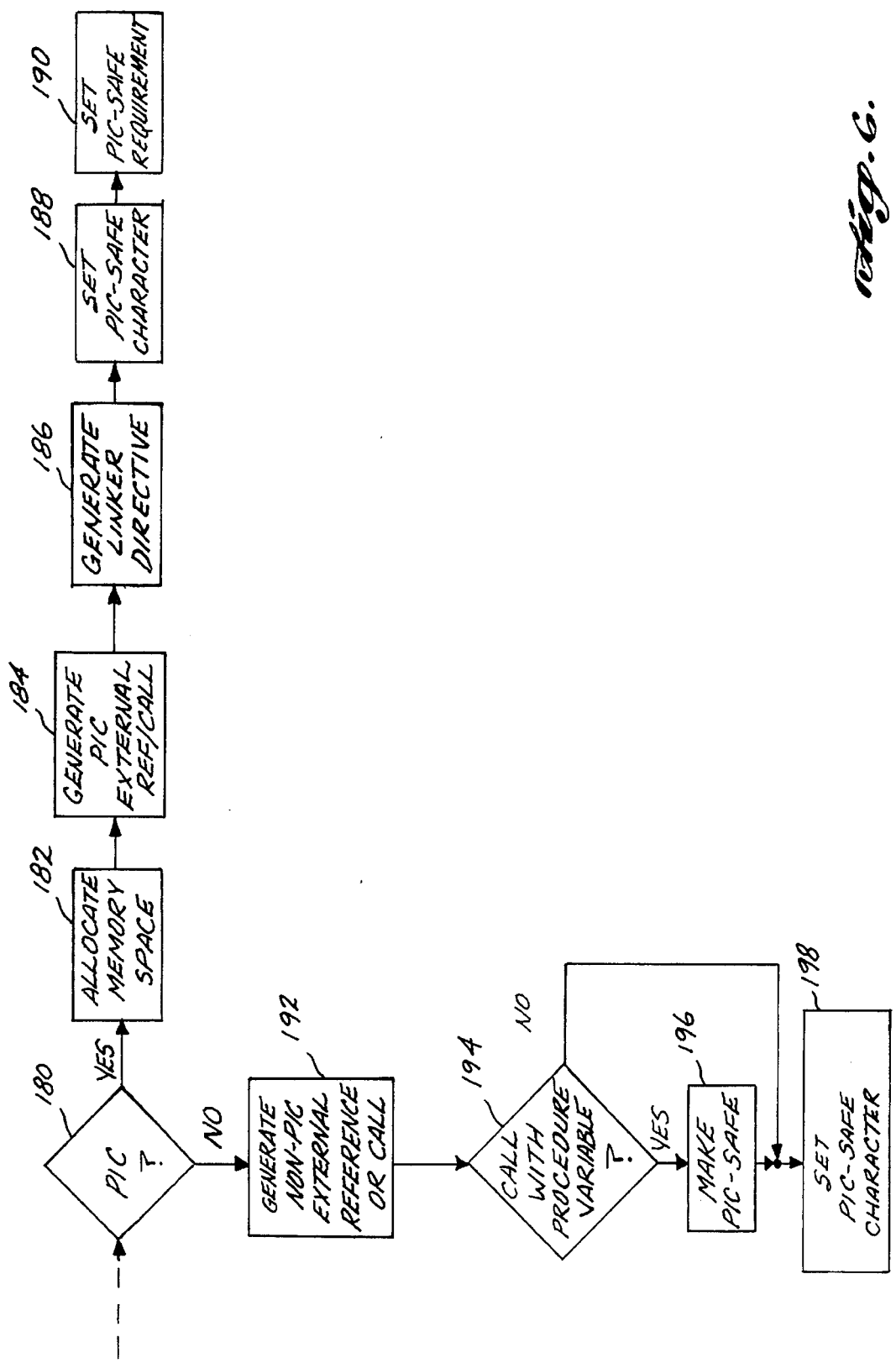
FIG. 6 is a flowchart that depicts the manner in which the system compiler contributes to and supports the invention.
Figure 7:
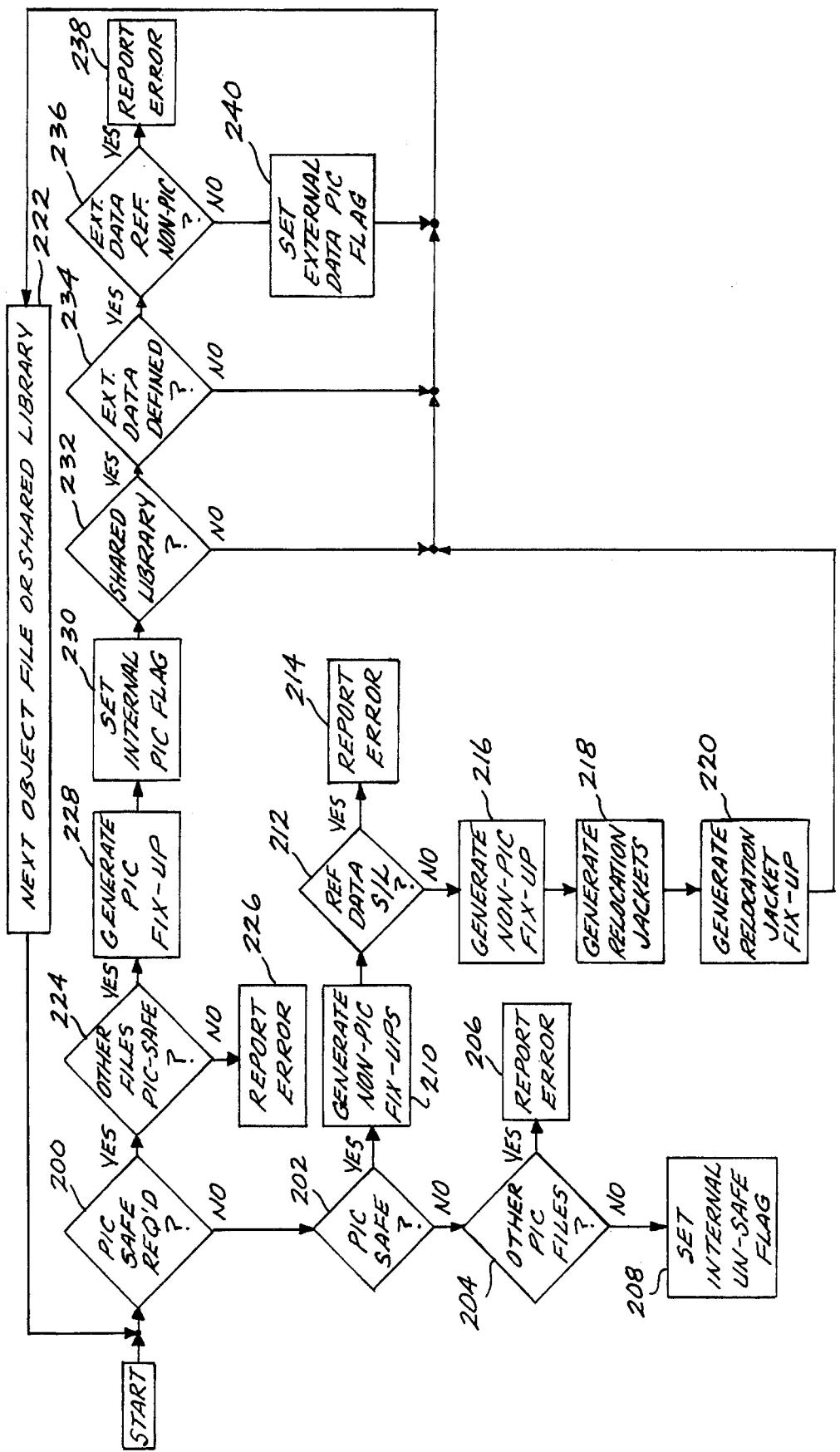
FIG. 7 is a flowchart that illustrates the manner in which the digital data system linker/loader contributes to and supports the invention.

As shall be described relative to FIGS. 6 and 7, the call sequence instructions for implementing the above set forth mathematical expression and the two memory offset pointer values utilized in the expressions are formulated during operation of the digital data processing system for compilation and linking of the code that results in the process procedures and data sets.

An example of coded instructions that cause the digital data processing system to operate in accordance with the above set forth mathematical expression is illustrated in FIG. 2 for call sequence 84. Basically, the depicted instructions cause central processing unit 12 of FIG. 1 to: (a) access (save) the value then stored in procedure entry point register 66; (b) determine the address of the memory field that stores the address of the procedure being called; (e) access the memory field that stores the address of the procedure being called; (d) transfer (pass) the address of the procedure being called to the procedure entry point register 66; and (e) use the address stored in the procedure entry point register 66 to begin execution of the called procedure.

In the call sequence instructions illustrated in FIG. 2, an instruction 100 saves the value stored in the procedure entry point register 66 by setting a calculation variable PERM1 equal to the register value. Instruction 102 of the depicted call sequence instruction partially calculates the address of the memory field that stores the address of the procedure being called (Procedure B) by adding the calculation variable PERM1 to the instruction offset. As indicated in FIG. 2, by dashed outline 104, the instruction offset for call sequence 84 is a memory offset pointer that locates a call sequence instruction address (indicated by dashed outline 106) relative to the entry point address of Procedure A (Address A; dashed outline 88 in FIG. 2). At instruction 108 of the depicted call sequence, the value that results from instruction 102 is added to the address offset value to yield the address of the memory field that stores the address of Procedure B (memory field 92 in FIG. 2, which is located at Address X). As indicated by dashed outline 110 in FIG. 2, the address offset for call sequence 84 is a memory offset pointer that locates instruction address 106 relative to Address X of memory field 92. Instruction 112 of the call sequence shown in FIG. 2 causes the address of Procedure B to be transferred (passed) to procedure entry point register 66 and instruction 114 causes the digital data processing system to invoke and begin executing Procedure B.

Substitution of the memory addresses represented by address offset 110 and instruction offset 104 into call sequence instructions 102 and 108 demonstrates that the instructions yield the address of the memory field that stores the address of Procedure B (Address X of memory field 92, in FIG. 2). Specifically, as can be seen in FIG. 2, INSTRUCTION OFFSET 104 is equal to the difference between INSTRUCTION ADDRESS 106 and ADDRESS A. Thus, instruction 102 is equivalent to:

ADDRESS=PERM1+(INSTRUCTION ADDRESS 106—ADDRESS A.)

As previously described, at instruction 102 PERM1 was set equal to the current value stored in procedure entry point register 66 (which, for call sequence 84 is Address A). Thus, call sequence instruction 102 resolves to INSTRUCTION ADDRESS. Since ADDRESS OFFSET 110 is equal to the difference between Address X and INSTRUCTION ADDRESS 106, call sequence instruction 108 thus resolves to Address X, which is the address of memory field 92 (the storage location of the address of Procedure B).

Since the above-discussed set of call instructions for call sequence 84 passes the address of Procedure B to procedure entry point register 66, it can be recognized that, if Procedure B includes a call sequence to call and invoke another procedure, the entry point address of the new procedure will be determined and passed to procedure entry point register 66 in the same manner as described above. Thus, the invention allows calling of additional procedures in any desired manner and at any point of execution.

Although call sequence instructions of the type described relative to call sequence 84 in FIG. 2 also can be utilized to access a set of data that is external to a procedure, passing the address at which the external data is stored to procedure entry point register 66 is an unnecessary step. Specifically, the practice of the invention requires that procedure entry point register 66 (or equivalent memory space) store the entry point address of the procedure being executed. Thus, if data is accessed using coded instructions of the type described relative to call sequence 84, procedure entry point register 66 will be loaded with the initial address of the accessed data and it will be necessary to restore procedure entry point register 66 to its previous value once the external data is accessed.

To minimize the number of instructions required for accessing external data, the currently preferred embodiments of the invention employ data access instructions that do not alter the value stored in procedure entry point register 66. One such instruction set is illustrated in FIG. 2 relative to External Reference 86 and includes instructions 116, 118 and 120, which substantially correspond to instructions 100, 102 and 108 of the above-described call sequence instructions. In this regard, the instructions of the external reference sequence differ from the instructions of call sequence 84 in that: the external reference instructions utilize a calculation variable TEMP rather than the calculation variable ADDRESS; and, the instructions do not include an instruction for changing the value stored in procedure entry point register 66. In implementing the depicted arrangement, TEMP can be stored in a register or any convenient memory location that can be referenced by the central processor unit for accessing the required external data. As can be seen in FIG. 2, the INSTRUCTION OFFSET 122 and the ADDRESS OFFSET 124 for external reference 86 respectively denote memory offset pointer values of an INSTRUCTION ADDRESS 126 of external reference 86 relative to the entry point of Procedure A (Address A) and relative to the address of the memory field in which the address of the data set to be accessed is stored (memory field 94 at Address Y in FIG. 2). Thus, it can be recognized that execution of instructions 116, 118 and 120 of external reference 86 in FIG. 2 will cause the register TEMP (or other convenient memory location) to hold Address Y, which allows central processor unit 12 of FIG. 1 to execute instruction 128 and access the required data set.

In view of the above-described aspects and features of the invention, it can be recognized that the invention provides position independent code that does not require or rely upon a program counter. Further, position independent code in accordance with the invention utilizes a minimal number of instructions for calling another procedure or accessing data sets that are external to the procedure. Thus, the invention can be used in a wide range of data processing environments and is sufficient both with respect to memory overhead and execution time. To further extend the applicability of the invention, the currently preferred embodiments include provisions that allow compiled procedures that incorporate and support the invention to be loaded and executed in processes that also include compiled procedures that incorporate prior art position dependent code. This extension of the invention can be important in various situations since it allows a system user to create and execute processes that partially consist of programs that were previously written by the user or have been acquired from other sources.

In essence, the currently preferred embodiments of the invention insure maximum compatibility between the position independent code of the invention and compiled program parts that employ position dependent code call sequences to invoke and execute other procedures and/or position dependent code references to external data by: (a) detecting those situations in which object files that incorporate position independent code and object files that incorporate position dependent code are present; and (b) if necessary and appropriate, modifying the instructions of the position dependent code procedures so that the procedures become "safe" for execution in combination with the procedures that employ and depend upon the position independent code of the invention.

When object files that incorporate and depend upon position independent code and position dependent code object files are both produced during compilation, the digital data processing system operates to determine whether the position dependent code procedures include calls to position independent code procedures and, in addition, whether position dependent code calls are present that are made via procedure variables. If neither of these conditions are present and, in addition, if the position dependent code procedure does not include references to external data that is included in an external (shared) library, the position dependent code procedure can be executed in combination with procedures that employ and are dependent upon the position independent code of the invention (i.e., the position dependent code procedure is "safe"). Although position dependent code call sequences of this type are executable by loading the called procedure at the address designated by the call sequence, the address at which the called procedure is loaded into memory preferably is determined by the digital data processing system when the calling and called procedures are linked and the position dependent code call sequence is modified to reflect the address at which the called procedure is loaded into memory.

In accordance with the invention, position dependent code call sequences that reference position independent code procedures are in effect converted to position independent code calls which allow relocation of the called procedure to available memory space that is allocated during compilation and linking of the procedures. In particular, the digital data processing system generates a set of relocation instructions (a specific subroutine); stores the relocation instruction set at an available memory address; and modifies the position dependent code call sequence so that the call sequence includes the memory address of the relocation instructions instead of the memory address that originally was specified as the address of the called procedure. When executed, the relocation instruction set loads the memory address at which the system stores the called procedure into the previously described memory space that is allocated for storage of the entry point address of the procedure being executed (e.g., procedure entry point register 66 of FIG. 1). In addition, the relocation instruction set causes the system to transfer control ("jump") to the address at which the called procedure is located. Since the relocation instructions cause the entry point address of the called procedure to be loaded into the procedure entry point register, and, further, cause the called procedure to be invoked for execution, subsequent call sequences or external data references that are included in the called procedure can be accomplished in the manner described relative to FIG. 2.

Figure 3A:
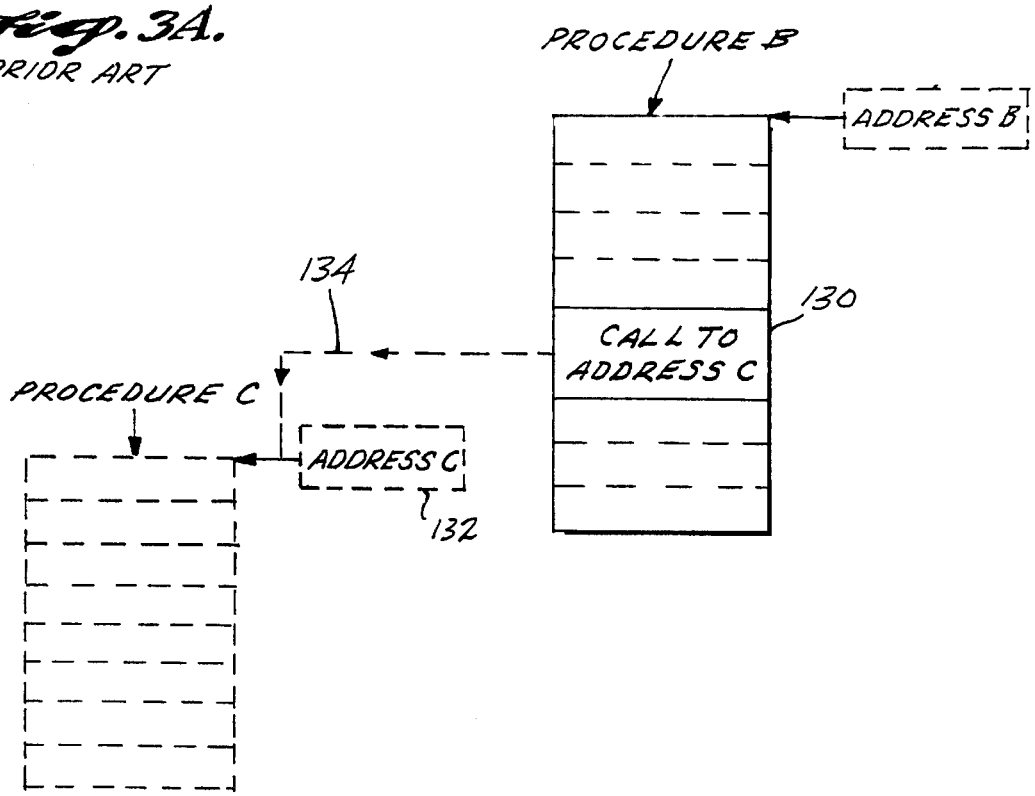
FIG. 3A illustrates a typical memory arrangement in which a procedure includes prior art position dependent code instructions for calling a second procedure that is loaded into system memory at an address that is dictated by the call instructions.
Figure 3B:
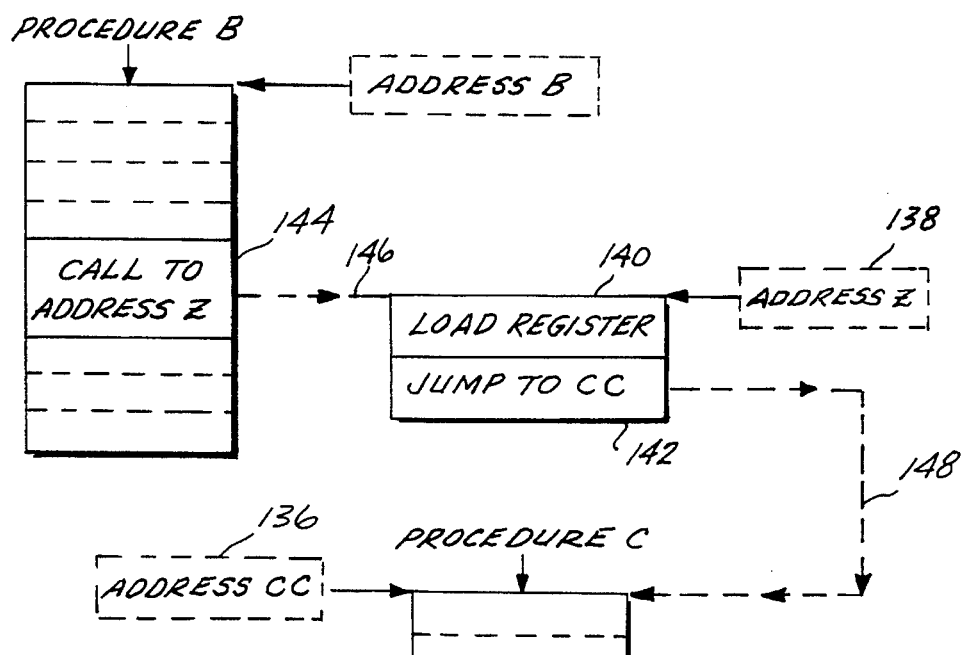
FIG. 3B illustrates the manner in which the prior art instructions of FIG. 3A are supplemented and modified to allow procedures that employ prior art position dependent call instructions to be utilized in combination with procedures that employ the position independent code of the invention.

FIGS. 3a and 3b respectively depict the manner in which a procedure is called utilizing a prior art position dependent call sequence and the manner in which the invention can be embodied to modify such a position dependent call sequence so that it is compatible with the position independent code of the invention. In the prior art arrangement of FIG. 3a, a position dependent code procedure (Procedure B) includes an instruction 130 to call Procedure C at Address C (indicated by dashed outline 132). As is indicated by dashed arrow 134, when instruction 130 is executed, the entry point instruction of Procedure C is accessed and executed. If Procedure C has not been or cannot be loaded at Address C, Procedure C cannot be invoked for execution.

As is indicated in FIG. 3b, in embodiments in the invention that support combined used of procedures that employ the position independent code of the invention and procedures incorporating position dependent code, during the linking and loading of called Procedure C with calling Procedure B, Procedure C is loaded into an available memory address. In FIG. 3b, Procedure C has been loaded in memory at Address CC, indicated in FIG. 3b by dashed outline 136. Also loaded into an available memory address (Address Z in FIG. 3; dashed outline 138) is the previously mentioned set of relocation instructions that was formulated by the system during the compilation and linking process. In FIG. 3b the relocation instructions consist of a Load Register instruction 140 and a Jump to CC instruction 142. In addition, as is indicated by instruction 144 of Procedure B, of instruction 130 of FIG. 3a is modified to call Address Z, instead of Address C. As is indicated by dashed arrow 146, when instruction 144 of Procedure B is executed, the digital data processing system accesses instruction 140 (at Address Z), which causes procedure entry point register 66 (FIG. 1) to be loaded with the entry point address of Procedure C (Address CC). As is indicated by dashed arrow 148, when instruction 142 is executed, the digital data processing system accesses and executes the first instruction of Procedure C.

In addition to establishing compatibility under which position dependent code is adopted to allow the code to call other compiled procedures that utilize position independent code, the currently preferred embodiments of the invention also include provision for modifying position dependent code call sequences that are made through a procedure variable or include an argument that passes one procedure to another. In this regard, and as is known to those skilled in the art, various high level programming languages support calls via procedure variables and support "call backs" in which a calling procedure passes a procedure (e.g., a subroutine of the calling procedure) to the called procedure so that execution of the called procedure will include execution of the passed procedure. For example, C programming language permits a programmer to designate a procedure as a procedure variable and pass the procedure to another procedure by using an instruction that includes the procedure variable. In programming languages such as PASCAL, a procedure cannot be passed to another procedure by specification of a procedure variable to identify the procedure being passed. However, the procedure can be passed by using an instruction that includes the name of the passed procedure as an argument of the instruction.

To establish compatibility between procedures that employ one or more call sequences that pass a procedure to the called procedure or utilize another form of a procedure variable call, the currently preferred embodiments of the invention include instructions for loading procedure entry point register 66 of FIG. 1 with the entry point address of the procedure being invoked for execution. For example, FIG. 4 illustrates the manner in which a call back sequence 150 that is included in a position dependent code procedure (identified as Procedure D) can be formulated so that call back sequence 150 (and, hence, Procedure D) is safe to use in a process that includes procedures that employ the position independent code of the invention.

Figure 4:
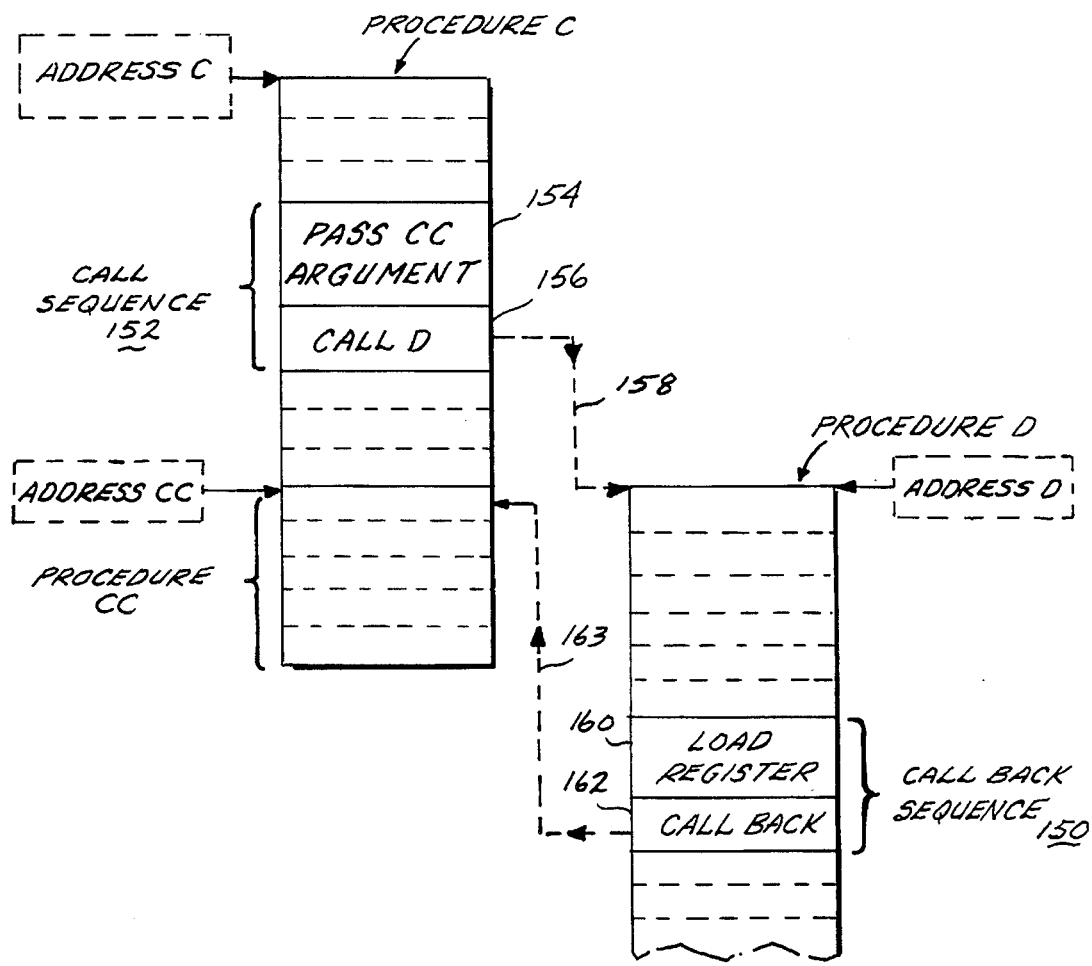
FIG. 4 illustrates two procedures that are loaded into system memory and indicates the manner in which the invention can be arranged to establish compatibility of the position independent code of the invention with procedures that utilize call back sequences in which a called procedure causes the invocation and execution of a subroutine that is included in the calling procedure.

In the exemplary arrangement of FIG. 4, Procedure D is called by Procedure C, which includes a subroutine (Procedure CC). Included in Procedure C is a call sequence 152, which includes instructions 154 and 156. As is indicated in FIG. 4, instruction 154 formulates an argument for the calling procedure that will cause the address of Procedure CC to be passed to called procedure D. Instruction 156 causes Procedure D to be called and may be implemented with either position independent code or position dependent code. As is indicated by arrow 158 of FIG. 4, when call instruction 156 is executed, the digital data processing system accesses the first instruction in Procedure D (located at memory address D). When call back sequence 150 is executed, a Load Register instruction 160 causes the address of Procedure CC (Address CC) to be loaded into procedure entry point register 66 of FIG. 1 (or other memory space that has been allocated for storing procedure entry point addresses in accordance with the invention). As is indicated by arrow 163, instruction 162 of call back sequence 150 then causes the system to utilize the loaded address to access (call back to) Procedure CC.

Figure 5:
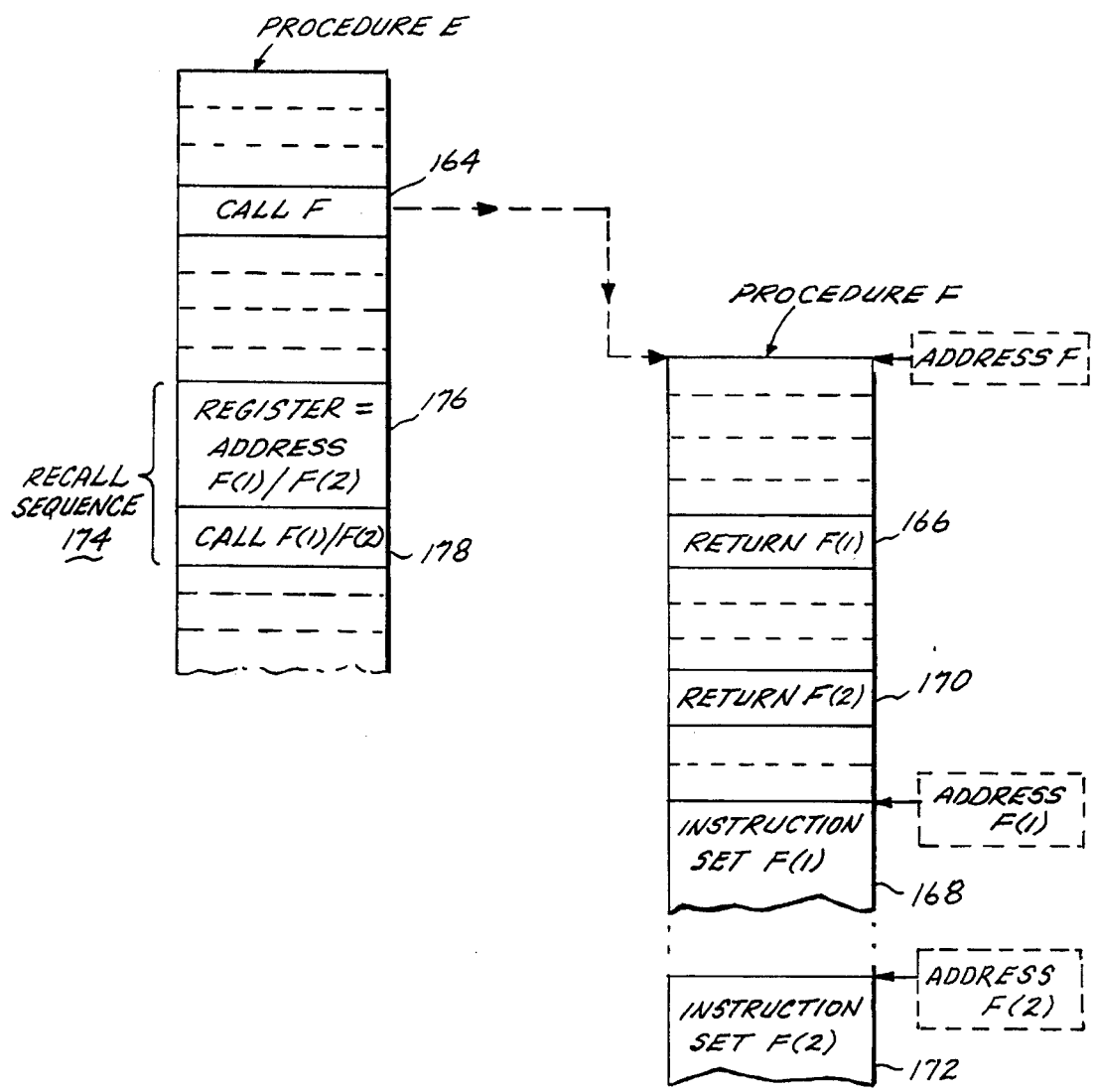
FIG. 5 illustrates two procedures that are loaded into system memory and indicates the manner in which the invention can be arranged to establish compatibility between the position independent code of the invention and procedures that include instructions for calling a different procedure via a procedure variable.

FIG. 5 provides an additional example of a procedure variable position dependent code call sequence which can be made compatible with the position independent code of the invention by adding coded instructions that cause the entry point address of each procedure that is called to be loaded into procedure entry point register 66 when the procedure is invoked for execution. In the example depicted in FIG. 5, a Procedure E calls Procedure F, which performs a specific subtask. Processing control is then temporarily returned to Procedure E along with an identification of a particular set of instructions within Procedure F that are to be called and executed after execution of a specific portion of Procedure E. Referring more specifically to FIG. 5, Procedure F is called by Procedure E (call instruction 164). Execution of Procedure F results in an instruction that returns the processing control to Procedure E either: (a) by means of a procedure variable call 166 (which identifies an instruction set F(1) of Procedure F; indicated by reference numeral 168; or, (b) by means of a procedure variable call 170 (which identifies an instruction set F(2); indicated by reference numeral 172). As is indicated by recall sequence 174 of Procedure E, during the subsequent execution of Procedure E, Procedure F is again called, with the call being made to instruction set F(1) or instruction F(2), in accordance with the procedure variable return call that was provided by Procedure F to Procedure E (i.e., depending upon whether Procedure F executed return instruction 166 or return instruction 170).

As will be recognized by those skilled in the art, position dependent code procedure variable call sequences are utilized in numerous ways that are not shown by FIGS. 4 and 5. However, it also should be apparent to those skilled in the art that establishing compatibility between position dependent procedure variable call sequences and the position independent code of the invention requires only that the entry point address of a called procedure is transferred to and loaded into the same storage location that is utilized to store the entry point address of procedures that are called in accordance with the position independent code call sequences described relative to FIGS. 1 and 2 (e.g., loaded into procedure entry point register 66 of FIG. 1). As was described relative to FIGS. 1 and 2, loading the entry point address of a called procedure into specifically allocated memory such as procedure entry point register 66 during the call sequence in which the called procedure is invoked for execution allows the called procedure to utilize call sequences that employ the position independent code of the invention.

In describing both the position independent code of the invention and the provisions that allow execution of the position dependent code procedures in combination with procedures that employ the position independent code of the invention, reference has been made to the manner in which the system compiler and linker/loader support and contribute to the invention. A further understanding of the manner in which the digital data system compilation sequence and the digital data system linking and loading sequence support and contribute to the invention can be had by reference to FIGS. 6 and 7.

FIG. 6 illustrates a portion of a compilation sequence that suitably supports the currently preferred embodiments of the invention. In the arrangement of FIG. 6, as each program part is being compiled, each external reference for accessing data and each call sequence for invocation and execution of a procedure is detected and a determination is made as to whether the external reference or call sequence involves position independent code or position dependent code (indicated at decisional block 180 of FIG. 6). As is indicated at block 182 of FIG. 6, if position independent code is utilized in the external data reference or the call sequence, memory space is allocated for storing the address of the initial data item of the external data set to be accessed or the entry point address of the procedure to be called. For example, in the previously described arrangement of FIG. 2, during compilation of the source code module that results in Procedure A memory space is allocated for storing the address of Procedure B (memory field 92 of linkage code 90) and memory space is allocated for storing the address of Data Set D (memory field 94 of linkage code 90). After allocating memory space for storing the address of external data or the entry point address of a called procedure instructions are generated for the call sequence or the external data reference (indicated at block 184). More specifically, the memory offset pointer that locates the call sequence instruction (or data access instruction) relative to the start of the procedure being compiled is determined and an instruction is generated that, in effect, calculates the memory location of the call sequence instruction (or data access instruction). For example, with reference to FIG. 2, instruction offset 104 is determined during compilation that results in call sequence 84. Using that instruction offset, the instructions 100 and 102 of FIG. 2 are generated, which correspond to the previously described mathematical relationship.

ADDRESS=ENTRY POINT REGISTER VALUE+INSTRUCTION OFFSET

Likewise, during compilation that results in external reference 86 of FIG. 2, the digital data processing system determines instruction offset 122 and generates instructions that are identical or equivalent to instructions 116 and 118.

As is indicated a block 186 of FIG. 6, after generating the instructions for a position independent code external data reference or a position independent code call sequence, the system generates a linker directive which will cause the system linker (e.g., linker/loader 48 of FIG. 1) to perform two operations which complete the external data reference instruction or the call sequence. The first operation that will be performed by the linker is determining the difference between the address of the call sequence instruction (or data access instruction) and the memory address at which the address of the procedure being called (or data set being accessed) will be loaded into memory. As was described relative to FIG. 2, this difference corresponds to the address offset pointer (e.g., Address Offset 110 for call sequence 84 of FIG. 2; Address Offset 124 for external data reference 86 of FIG. 2). The second operation that will be performed by the linker is combining the address offset with the instructions generated at block 184 of FIG. 6. When the linker has completed the second operation, the instruction set for the calling sequence will yield the memory address at which the address of the entry point of the procedure being called (or the address of the initial data item of the data set being accessed). That is, the instruction set will correspond to the previously described mathematical relationship.

ADDRESS=ENTRY POINT REGISTER VALUE+INSTRUCTION OFFSET +ADDRESS OFFSET

In those embodiments of the invention that allow the position independent code of the invention to be used in conjunction with procedures that employ position dependent call sequences, each compiled position independent code procedure is identified in a manner that indicates that the procedure can safely be used with other position independent code procedures. Further, the position independent code procedures are identified in a manner that indicates that all other procedures must be compatible with the position independent code of the invention. Operation of the compiler to establish an indicator that characterizes a procedure as being safe for use with other position independent code procedures is indicated at block 188 of FIG. 6. Operation of the compiler to provide an indication that the procedure being compiled must be used with procedures that safely support the position independent code of the invention is indicated at block 190. In the currently preferred embodiments of the invention, these two indicators are provided by flags that are incorporated in a section of image file and object file code that is not shown in the drawings. As is known to those skilled in the art, such sections of code often are used to reflect various attributes and characteristics of the compiled and linked procedures that are contained in the related object file and image file.

If it is determined at block 180 of FIG. 6 that the procedure being compiled utilizes procedure dependent code, a suitable set of dependent code external reference instructions or a suitable set of position dependent code call sequence instructions are generated (indicated at block 192). If the instructions are for calling another procedure, it then is determined whether the call that is being made via a procedure variable (decisional block 194 in FIG. 6). If a procedure variable call is present, the call sequence instructions generated at block 192 are then supplemented in the manner discussed relative to FIGS. 4 and 5 so that the instructions become compatible with the position independent code of the invention. This operation is indicated at block 196 of FIG. 6 and, as previously described relative to FIGS. 4 and 5, basically consists of generating coded instructions that will cause the address of each procedure that is called with a procedure variable to be loaded into the memory space allocated for storage of the entry point address of the procedure that is being executed (e.g., procedure entry point register 66 of FIG. 1).

When the position dependent code procedure variable called sequences have been made compatible with the position independent code of the invention (or if coded instructions to establish such compatibility are not required), the previously discussed flag or other indicator is established to indicate that the position dependent code procedure being compiled can safely be combined with procedures that employ the position independent code of the invention (indicated at block 198 of FIG. 6).

Shown in FIG. 7 is a flow chart of a linking routine that can be utilized in combination with the above-described compilation sequence. In the linking routine shown in FIG. 7, as the object code of each object file and each shared library is processed, it is determined at decisional block 200 whether the object file or shared library must be safe for use with the position independent code of the invention. This determination corresponds to a determination of whether the object file or shared library is position independent code or position dependent code. The determination can be based, for example, on the flag or indicator that was set at block 190 of FIG. 6 in each instance in which the compiled code included position independent call sequence instructions and/or external reference instructions.

If it is determined at decisional block 200 that the object file or shared library procedure being linked utilizes the prior art position dependent code for calling another procedure or accessing external data, it next is determined whether the object file or shared library procedure being linked is safe for execution with procedures that employ the position independent code of the invention. This determination is indicated at block 202 of FIG. 7 and, for example, can be based upon the flag or indicator that was set at block 198 of the compilation routine of FIG. 6. If the object file or shared library procedure being linked does not safely support the position independent code of the invention, a determination is made as to whether one or more object files that were previously linked into the process being executed utilize the position independent code of the invention (decisional block 204 in FIG. 7). In the linking routine shown in FIG. 7, this determination is made on the basis of a flag or indicator that is used only during the linking procedure (i.e., an "internal" flag). As shall be described relative to block 230 of the depicted routine, this internal flag or indicator is set when an object file or shared library procedure that is being linked utilizes the position independent code of the invention.

If it is determined at decisional block 204 that a previously linked object file or shared library procedure utilizes the position independent code of the invention, an error message is generated to inform the system user that an improper attempt is being made to combine procedures that employ the invention with a prior art procedure that will not support the use of the invention (indicated at block 206). On the other hand, if no previously linked object file or shared library procedure utilizes the position independent code of the invention, an internal flag or indicator is set to indicate the presence of object files or shared library procedures that cannot be used in conjunction with procedures that employ the invention. The setting of this internal "unsafe" flag is indicated at block 208 of FIG. 7 and serves two purposes. First, in the linking routine of FIG. 7, the internal flag is used during the linking of procedure independent code object files or shared library procedures to detect an erroneous attempt to utilize procedures and employ the invention in conjunction with prior art position dependent code procedures that have not been modified to support the invention. Second, this internal flag (and the linking operation described relative to decisional blocks 202 and 204) allow the digital data processing system to compile, link, load and execute program code that results only in procedures that employ prior art position dependent code. Thus, a data processing system that employs the linking routing of FIG. 7 can be operated in a mode in which all call sequences and/or external data references are made with prior art position dependent code and further, can be operated in a mode that provides the herein described advantages of the invention.

As was described previously, a determination was made at decisional block 202 as to whether the position dependent code object file or shared library procedure being linked can safely support procedures that employ the position independent code of the invention. As is indicated at block 210, if the object file or shared library procedure being linked will support the practice of the invention, the linker modifies the position dependent code call sequences of the object file or library procedure. More specifically, as was previously described, in the currently preferred embodiments of the invention, position dependent code procedures that are called by another position dependent code procedure are loaded into available memory space, instead of the address specified by the position dependent code call sequence. The address of the available memory space is determined during the linking routine and the linker modifies the call sequence of the calling procedure to specify the address of the memory space into which the called procedure is loaded instead of the memory address specified by the program code.

Next, at decisional block 212, it is determined whether the object file or shared library procedure being linked includes external references to data sets that are contained in a separate shared library. If such references are included, the linker will be unable to resolve the references. Accordingly, such references result in an error message to the system user (indicated at block 214). If no external references to data sets that are contained in a shared library, the linker allocates space for storage of the data sets referenced by the object filed or shared library being linked. The position dependent code references to the external data sets are then modified to specify the address of the allocated memory space for the data instead of the address that is specified by the position dependent code external references. This operation is indicated at block 216 of FIG. 7 and corresponds to the memory space allocation and modification of position dependent code call sequences that was described relative to block 210.

When all position dependent code references to external data have been established, the linker operates to generate the previously discussed sets of relocation instructions that allow the calling of position independent code procedures by position dependent code calling sequences. As was previously discussed, in the relocation procedure of the currently preferred embodiments of the invention, the linker: (a) causes the called procedure to be stored at an available memory address instead of the address specified by the program code; (b) generates a set of relocation instructions which are stored at a second available memory address; and (c) modifies the position dependent code call sequence instruction of the calling procedure to specify the address at which the relocation instruction set is stored instead of the address originally specified by the position dependent code call sequence. As was discussed relative to FIG. 3b, the relocation instructions specify the address at which the procedure has been stored. Thus, when the modified position dependent code call sequence is executed, the system will invoke the procedure via the stored relocation instruction set, with one of the instructions (e.g., instruction 140 in FIG. 3b) causing the system to store the address of the called procedure in procedure entry point register 66 of FIG. 1. In FIG. 7, the generation of the relocation instruction sets is indicated at block 218 and the modification of the position dependent code call sequence is indicated at block 220.

When the necessary sets of relocation instructions have been generated, linking of the position dependent code object file or shared library procedure is complete. The digital data processing system then sequences to access the next object file or shared library procedure (indicated at block 222 in FIG. 7) and the linking procedure is initiated for the newly accessed object file or shared library procedure.

When the object file or shared library procedure that is being linked is a position independent code procedure, it is first determined whether all other files that have been linked into the process are safe for execution with position independent code procedures. Specifically, if it is determined at decisional block 200 that the object file or shared library procedure being linked includes position independent code, a determination is made at decisional block 224 as to whether object files and shared library procedures that previously were linked into the process being executed are safe for use with the position independent code of the invention. This determination can be based on the previously discussed internal flag that is set during the linking of position dependent code object flies or shared library procedures that are not safe for use in combination with the procedures that employ the position independent code of the invention (block 208 of FIG. 7). If one or more of the previously linked object files or shared library procedures does not safely support use of a procedure that employs the position independent code of the invention, an error message is provided to the system user (block 226).

Once it has been determined that all other previously linked object files and/or shared library procedures are compatible with the procedure independent code of the invention, the digital data processing system modifies the coded instructions of each position independent code call sequence and each position independent code reference to an external data set. This modification, which is indicated at block 228 in FIG. 7, consists of complying with the previously described linker directives that are generated during compilation of the program parts (i.e., the linker directives discussed relative to block 186 of FIG. 7). Specifically, as was previously stated, the address offset for each respective call sequence and/or external data reference is determined and added to the associated call sequence instructions or external data references. For example, with respect to the previously discussed call sequence 84 of FIG. 2, address offset 110 is determined and the value thereof is placed in call sequence instruction 108. Similarly, with respect to external reference 86 of FIG. 2, address offset 124 is determined and its value is placed in external reference instruction 120.

When the instructions of each independent code call sequence and each independent code external reference have been modified or "fixed-up," the previously mentioned internal flag that indicates presence of an object file or shared library that includes position independent code call sequences and/or external references is set (at block 230). As will be recalled, this internal flag is utilized in the linking of position dependent code object files or shared library procedures to indicate that an attempt is being made to use files or procedures that employ position independent code of the invention in conjunction with position dependent code files or shared library procedures that cannot safely be used with the position independent code of the invention (determined at decisional block 204).

As is indicated at decisional block 232 of FIG. 7, the next step of the depicted linking procedure is determining whether the code being linked is an object file or a shared library procedure. If the code is an object file, the linking procedure is complete and the digital data system accesses the next object file or shared library procedure (indicated at block 222) so that the linking procedure can be initiated for that file or shared library. If the code being linked is a shared library, it next is determined whether the shared library includes data that is stored external to the procedures of the shared library (indicated at decisional block 234). If the shared library does not define external data, the linking process for the shared library is complete and the digital data processing system obtains the next object file or shared library (block 222) for reinitiation of the linking procedure. If the shared library includes one or more data sets that are external to the procedures of the shared library, a determination is made at decisional block 236 as to whether references to the external data of the shared library are made with position independent code or position dependent code. If one or more position dependent code external references is present, an error is reported (indicated at block 238). If all references to the external data are position independent code references, an indicator or flag is set to indicate the presence of external data in the shared library (indicated block 240). In the preferred embodiments of the invention, this indicator or flag is used to indicate that the shared library external data is to be loaded into system memory before any reference to the external data is made. In these embodiments, the flag is included in the previously-mentioned section of the image that includes that code.

The embodiments of the invention in which an exclusive property or privilege is claimed are defined as follows:

1. A position independent code method implemented in a digital data processing system of the type that includes an addressable memory, a data and addressing bus, and one or more processing units interconnected with the addressable memory via the data and addressing bus for sequentially accessing and executing coded instructions stored in the addressable memory, at least a portion of the coded instructions collectively defining two or more procedures that are established by the processing units during compilation, linking, and loading of program code that is supplied to the digital data processing system, at least a portion of the procedures being loaded into the addressable memory at memory addresses that are not determined until such procedures are loaded into addressable memory, said position independent code method enabling the processing units to at least temporarily cease execution of the coded instructions of a procedure being executed by invoking and executing coded instructions of another procedure, said position independent code method comprising:

(a) during the compilation, linking, and loading of each procedure that is loaded into addressable memory, performing the steps of:

(1) detecting coded instructions of the procedure being compiled, linked and loaded that require invoking and executing coded instructions of a different procedure when said detected coded instructions of said procedure being compiled, linked and loaded are subsequently executed by said digital data processing system;

(2) for each detected coded instruction that requires invocation and execution of coded instructions of a different procedure, allocating a storage location in the addressable memory for subsequently storing the memory address at which the first coded instruction of the coded instructions of the different procedure that is to be invoked and executed is stored when the different procedure is loaded into the addressable memory;

(3) for each detected coded instruction that requires invocation and execution of coded instructions of a different procedure, generating a call sequence instruction set that includes at least one coded instruction, the call sequence instruction set being added to the coded instructions of the procedure requiring invocation and execution of coded instructions of a different procedure, the call sequence instruction set being executable by the processing units of the digital data processing system and including at least one coded instruction for accessing the addressable memory storage location at which the address of the different procedure being invoked and executed is stored when the different procedure is loaded into the addressable memory, the coded instruction providing access to the storage location at which the address of the different procedure is stored enabling the processing units to access the storage location on the basis of the entry point address of the procedure that includes the call sequence instruction set, such entry point address being established when the procedure that includes the call sequence instruction set is loaded into the addressable memory; and (b) during execution of each said procedure that includes one or more of the call sequence instruction sets that were detected during compilation, linking and loading of the particular procedure being executed, performing the steps of:

(1) storing the entry point address of the procedure being executed in a specific memory location of the digital data processing system;

(2) detecting and executing a call sequence instruction set of said procedure being executed to access the storage location of the addressable memory at which the memory address of the different procedure being invoked for execution was stored when the different procedure was loaded into the addressable memory;

(3) invoking and initiating execution of the different procedure by accessing and executing coded instructions stored at the memory address of the different procedure; and (4) storing the entry point address of the different procedure being invoked and executed in the specific memory location of the digital data processing system in place of the entry point address of the executed procedure that included the call sequence instruction set.

2. The digital data signal processing method of claim 1, wherein the specific memory location of the digital data processing system is a general register associated with at least one of the processing units of the digital data processing system.

3. The digital data processing method of claim 1 wherein the step of generating the call sequence instruction set further includes the steps of:

determining an instruction offset pointer representative of the location of the call sequence instruction set relative to the entry point instruction of the procedure that includes the call sequence instruction set;

determining an address offset pointer representative of the memory location of the storage location at which the memory address of the different procedure is stored when the different procedure is loaded into the addressable memory relative to the location of the call sequence instruction set.

4. The digital data signal processing method of claim 3, wherein the step of detecting and executing a call sequence instruction set includes the steps of:

determining the memory address of the call sequence instruction set solely from the entry point address currently stored in the specific memory location of the digital data processing system and the instruction offset pointer; and, accessing the storage location at which the memory address of the different procedure was stored when the different procedure was loaded into the addressable memory based solely upon the memory address of the call sequence instruction set and the memory address offset pointer.

5. The digital data signal processing method of claim 4, wherein the specific memory location of the digital data processing system is a general register associated with at least one of the processing units of the digital data processing system.

6. The digital data signal processing method of claim 5, wherein the step of generating said at least one coded instruction for accessing the addressable memory storage location at which the address of the different procedure being invoked and executed is stored comprises the generation of an instruction that can be represented mathematically as

ADDRESS=ENTRY POINT REGISTER VALUE+INSTRUCTION OFFSET +ADDRESS OFFSET where

ADDRESS represents the memory address of the storage location at which the first coded instruction of the different procedure that is to be invoked and executed is stored when the different procedure is loaded into the addressable memory, ENTRY POINT REGISTER VALE represents the memory address currently stored in the register associated with the processing unit executing the coded instructions that include the instruction set, INSTRUCTION OFFSET represents the value of the instruction offset pointer, and ADDRESS OFFSET represents the value of the memory address offset pointer.

7. The digital data signal processing method of claim 6, wherein at least one of the procedures established by the processing units during compilation, linking and loading of the procedures includes position dependent code instructions for loading a different one of the procedures at an address of the addressable memory that is specified by the position dependent code instructions; and, wherein said digital data signal processing method further comprises the steps of modifying the position dependent code instructions to enable loading of the procedure by the processing unit executing the coded instructions at an arbitrary available memory address instead of the address specified by the position dependent code instructions.

8. The digital data signal processing method of claim 7, wherein the step of modifying the position dependent code instructions includes the step of allocating memory space at an available memory address of the addressable memory of the digital data processing system for storage of an encoded signal representative of the arbitrary available memory address at which the procedure is loaded into the addressable memory;

generating a relocation instruction set that includes at least one coded instruction and is stored at a second available memory address of the addressable memory, said relocation instruction set being executable by the digital data processing system for accessing the available memory address at which is stored the encoded signal representative of the arbitrary available memory address at which the procedure is loaded into the addressable memory; and, replacing the position dependent code instructions that specify an address in the addressable memory with an instruction that is executable by the processing units of the digital data processing system, said instruction for accessing the second available memory address and, based on the address stored at the second available memory address, accessing the memory address at which the procedure that originally included position dependent code is stored.

9. The digital data signal processing method of claim 1, wherein the coded instructions for the execution of the digital data processing task include coded instructions that are executed by the digital data processing system to load at least one data set into the addressable memory, each such data set being required for execution of at least one of the plurality of procedures and being loaded at a memory location within the addressable memory that is not determined until the compilation, linking and loading of the program code; and wherein said digital data signal processing method is inclusive of a method for locating each such data set; the method of locating each such data set including the steps of:

allocating memory space at an available memory address of the addressable memory of the digital data processing system for storage of an encoded signal representative of the address at which each such data set is loaded into the addressable memory; and generating a data access instruction set for each data set required by the procedures, each such data access instruction set being included in the coded instructions of each procedure requiring the data set at an execution point at which the data set is required for execution of the procedure, each such data access instruction set including at least one coded instruction that is executable by the digital data processing system for locating the memory space allocated for storage of the address of the data set being accessed, the step of generating the data access instruction set including the steps of determining a memory address offset pointer representative of the memory location of the data access instruction set relative to the location of the memory space allocated for storage of the address of the data set being accessed and for formulating at least one instruction of the data access instruction set on the basis of the location of the data access instruction set and the memory address offset pointer.

10. The digital data signal processing method of claim 9, wherein the step of generating the data access instruction set further includes the steps of:

determining an instruction offset pointer representative of the memory location of the data access instruction set relative to the entry point address for the procedure in which the data access sequence is generated; and formulating at least one instruction of the data access instruction set on the basis of the entry point address of the procedure that includes the data access sequence, the instruction offset pointer, and the memory address offset pointer.

11. The digital data signal processing method of claim 10 wherein the step of detecting and executing a call sequence instruction set includes the steps of:

determining the memory address of the call sequence instruction set based solely upon the entry point address currently stored in the specific memory location of the distal data processing system and the instruction offset pointer; and, accessing the storage location at which the memory address of the different procedure was stored when the different procedure was loaded into the addressable memory based solely upon the memory address of the call sequence instruction set and the memory address offset pointer.

12. The digital data signal processing method of claim 11, wherein the specific memory location of the digital data processing system is a general register associated with at least one of the processing units of the digital data processing system.

13. The digital data signal processing method of claim 12, wherein the call sequence instruction set includes at least one instruction that can be represented mathematically as

ADDRESS=ENTRY POINT REGISTER VALUE+INSTRUCTION OFFSET +ADDRESS OFFSET where

ADDRESS represents the memory address of the storage location at which the first coded instruction of the different procedure that is to be invoked and executed is stored when the different procedure is loaded into the addressable memory, ENTRY POINT REGISTER VALUE represents the memory address currently stored in the register associated with the processing unit executing the coded instructions that include the instruction set, INSTRUCTION OFFSET represents the value of the instruction offset pointer, and ADDRESS OFFSET represents the value of the memory address offset pointer.

14. The digital data signal processing method of claim 13, wherein the at least one of the procedures established by the processing units during compilation, linking and loading of the procedures includes position dependent code instructions for loading a different one of the procedures at an address of the addressable memory that is specified by the position dependent code instructions; and, wherein said digital data signal processing method further comprises the steps of modifying the position dependent code instructions to enable loading of the procedure by the processing unit executing the coded instructions at an arbitrary available memory address instead of the address specified by the position dependent code instructions.

15. The digital data signal processing method of claim 14, wherein the step of modifying the position dependent code instructions includes the step of allocating memory space at an available memory address of the addressable memory of the digital data processing system for storage of an encoded signal representative of the arbitrary available memory address at which the procedure is loaded into the addressable memory.

16. The digital data processing method of claim 15, wherein the coded instructions for the execution of the digital data processing task further include instructions that utilize a procedure variable to invoke and execute another procedure of the plurality of procedures and wherein said digital data processing method further comprises the step of generating at least one instruction for each coded instruction that utilizes a procedure variable to invoke and execute another procedure, the one or more additional instructions including an instruction to transfer the memory address of each procedure that is invoked by a procedure variable to the storage location of the addressable memory for storing the memory address at which the first coded instruction of the coded instructions of the different procedure that is to be invoked and executed is stored, with the instruction to transfer the memory address of each procedure that is invoked by a procedure variable being executable prior to execution of the procedure that is invoked by means of a procedure variable.

17. The digital data signal processing method of claim 1, wherein the at least one of the procedures established by the processing units during compilation, linking and loading of the procedures includes position dependent code instructions for loading a different one of the procedures at an address of the addressable memory that is specified by the position dependent code instructions; and, wherein said digital data signal processing method further comprises the steps of modifying the position dependent code instructions to enable loading of the procedure by the processing unit executing the coded instructions at an arbitrary, available memory address instead of the address specified by the position dependent code instructions.

18. The digital data processing method of claim 17, wherein the step of modifying the position dependent code instructions includes the step of allocating memory space at an available memory address of the addressable memory of the digital data processing system for storage of an encoded signal representative of the arbitrary available memory address at which the procedure is loaded into the addressable memory.

19. The digital data processing method of claim 18, wherein the coded instructions for the execution of the digital data processing task further include instructions that utilize a procedure variable to invoke and execute another procedure of the plurality of procedures and wherein said digital data processing method further comprises the step of generating at least one instruction for each coded instruction that utilizes a procedure variable to invoke and execute another procedure, the one or more additional instructions including an instruction to transfer the memory address of each procedure that is invoked by a procedure variable to the storage location of the addressable memory for storing the memory address at which the first coded instruction of the coded instructions of the different procedure that is to be invoked and executed is stored, with the instruction to transfer the memory address of each procedure that is invoked by a procedure variable being executable prior to execution of the procedure that is invoked by means of a procedure variable.

20. A method of establishing position independent code in a digital data processing system of the type that includes at least one central processing unit and an addressable memory, the digital data processing system being operable for compiling, linking, and loading program code so as to establish a plurality of procedures in the addressable memory of the system, each procedure having at least one entry point address that identifies a set of consecutive coded instructions that are invoked and executed by the central processing unit of the digital data processing system to perform a digital data processing task, said method of establishing position independent code enabling the digital data processing system to execute the plurality of procedures in a sequence that is determined by the program code and, further, enabling the digital data processing system to load the procedures into the addressable memory at arbitrary available memory addresses, said method of establishing position independent code comprising the steps of:

(a) generating call sequences during compilation and linking of the program code, each call sequence being a set of at least one coded instruction for initiating invocation and execution by the digital data processing system of coded instructions of a different one of the procedures that define the data processing task, the step of generating each call sequence including the substeps of:

(1) allocating a memory field at an available memory address of the digital data processing system for storage of the entry point address of the procedure that is to be invoked and executed when the call sequence being generated is executed by a central processing unit of the digital data processing system;

(2) storing in the allocated memory field the entry point address of the procedure that is to be invoked and executed;

(3) determining the memory offset between the call sequence and the memory address of the allocated memory field;

(4) including coded instructions in the call sequence for determining the memory address of the allocated memory field, the coded instructions for determining the memory address being based upon the entry point address of the procedure that includes the call sequence, the memory offset between the call sequence and the memory address of the allocated memory field, and the memory offset between the call sequence and the entry point address of the procedure that includes the call sequence;

(b) storing the entry point address of the first procedure that is to be invoked and executed in performing the digital data processing task, with the entry point address being stored at a predetermined memory address of the digital data processing system;

(c) during execution of each procedure, detecting and executing call sequences to invoke and execute coded instructions of procedures different from the procedure that includes a detected call sequence; and (d) following execution of each call sequence by the digital data system, transferring the entry point address stored in the allocated memory field to the predetermined memory address of the digital data processing system to thereby provide the digital data processing system with the entry point address of the coded instructions currently being executed by the digital data processing system.

21. The method of claim 20, wherein the predetermined memory address for storage of the entry point address of the coded instructions being executed by the digital data processing system is a memory register that is associated with the central processing unit of the digital data processing system.

22. The method of claim 21, wherein the coded instructions for determining the memory address of the allocated memory field can be represented mathematically as:

$$ADDRESS = ENTRY\ POINT\ REGISTER\ VALUE + INSTRUCTION\ OFFSET + ADDRESS\ OFFSET$$

where

ADDRESS represents the memory address of the memory field storing the entry point address of the procedure that is to be invoked and executed, ENTRY POINT REGISTER VALUE represents the memory address currently stored in the memory register of the digital data processing system, INSTRUCTION OFFSET represents the value of the memory offset between the call sequence and the entry point address of the procedure that includes the call sequence, and ADDRESS OFFSET represents the value of the memory offset between the call sequence and the memory address of the allocated memory field.

* * * * *

UNITED STATES PATENT AND TRADEMARK OFFICE
CERTIFICATE OF CORRECTION

PATENT NO. : 5,504,901
DATED : April 2, 1996
INVENTOR(S) : R. Kim Peterson

It is certified that error appears in the above-indentified patent and that said Letters Patent is hereby corrected as shown below:

| COLUMN | LINE | |
|---|---|---|
| 6 | 36 | "the-user" should read --the user-- |
| 6 | 39 | "arid" should read --and-- |
| 8 | 15 | "]8" should read --18-- |
| 10 | 23 | "90"" should read --90-- |
| 25 (Claim 11, | 19 line 7) | "distal" should read --digital-- |

Signed and Sealed this

Twenty-sixth Day of November 1996

Attest:

BRUCE LEHMAN

*Attesting Officer*     *Commissioner of Patents and Trademarks*